United States Patent
Arslan et al.

(10) Patent No.: US 7,652,979 B2
(45) Date of Patent: Jan. 26, 2010

(54) COGNITIVE ULTRAWIDEBAND-ORTHOGONAL FREQUENCY DIVISION MULTIPLEXING

(75) Inventors: Huseyin Arslan, Tampa, FL (US); Mustafa Emin Sahin, Tampa, FL (US)

(73) Assignee: University of South Florida, Tampa, FL (US)

( * ) Notice: Subject to any disclaimer, the term of this patent is extended or adjusted under 35 U.S.C. 154(b) by 405 days.

(21) Appl. No.: 11/608,441

(22) Filed: Dec. 8, 2006

(65) Prior Publication Data

US 2007/0133387 A1 Jun. 14, 2007

Related U.S. Application Data

(60) Provisional application No. 60/597,546, filed on Dec. 8, 2005.

(51) Int. Cl.
*H04J 11/00* (2006.01)
(52) U.S. Cl. ...................................... 370/208
(58) Field of Classification Search ................ 370/203, 370/210, 206, 208, 464, 480; 455/39, 500, 455/507, 517, 522, 63.1, 91, 127.1
See application file for complete search history.

(56) References Cited

U.S. PATENT DOCUMENTS 7,415,245 B2 * 8/2008 Tinsley et al. ................ 455/62

2004/0092281 A1 * 5/2004 Burchfiel ..................... 455/522
2005/0164642 A1 * 7/2005 Roberts .................... 455/67.13
2007/0030796 A1 * 2/2007 Green ......................... 370/208

OTHER PUBLICATIONS

NPL_NovelPulseDesign_IEEECommSociety_2004_pgs-3220t03224.pdf.*

* cited by examiner

*Primary Examiner*—Kwang B Yao
*Assistant Examiner*—Obaidul Huq
(74) *Attorney, Agent, or Firm*—Molly L. Sauter; Smith & Hopen, P.A.

(57) ABSTRACT

The present invention provides a system and method for transmitting an ultrawideband (UWB) signal that is composed of an orthogonal frequency-division multiplexing (OFDM) based signal that is transmitted in an underlay manner and an impulse radio based signal that is transmitted in an overlay manner. The system and method are effective in determining an interference temperature for each of multiple carriers within the UWB signal and classifying each one of the multiple carriers of the channel as being an interfered carrier or a non-interfered carrier based on the interference temperature for each one of multiple carriers. The desired signal is then transmitted on the interfered carriers at a signal power that is not greater than the power limit of the underlay UWB policy and on the non-interfered carriers at a signal power that is greater than the power limit of the underlay UWB policy.

8 Claims, 7 Drawing Sheets a b c d

COGNITIVE ULTRAWIDEBAND-ORTHOGONAL FREQUENCY DIVISION MULTIPLEXING

CROSS-REFERENCE TO RELATED APPLICATIONS

This application claims priority from currently pending U.S. Provisional Patent Application No. 60/597,546 filed on Dec. 8, 2005, entitled "Cognitive Ultrawideband-Orthogonal Frequency Division Multiplexing".

BACKGROUND OF THE INVENTION

Wireless communication systems have been evolving substantially over the last two decades. The explosive growth of the wireless communication market is expected to continue in the future, as the demand for all types of wireless services is increasing. New generations of wireless mobile radio systems aim at providing higher data rates and a wide variety of applications to the mobile users, while serving as many users as possible. However, this goal must be achieved under the constraint of the limited available resources, including spectrum and power. Given the high price of the spectrum and its scarcity, the systems must provide higher capacity and performance through a better use of the available resources. The increasing spectrum shortage gives rise to a necessity for immediate solutions regarding the spectrum usage.

A strong future solution is the cognitive radio which aims at very efficient spectrum utilization employing smart wireless devices with sensing, learning, and adaptation capabilities. One of the main issues regarding the success of the cognitive radio is the development of high performance radio access technologies that can accommodate the requirements given above with highly adaptable transmission formats.

Ultrawideband (UWB) is becoming an attractive radio access solution for wireless communications, particularly for short and medium range applications. According to the modern definition, any wireless communication technology that has a bandwidth wider than 500 MHz or a fractional bandwidth greater than 0.2 can be considered a UWB system.

A basic technique considered for implementing UWB is the impulse radio, which is based on transmitting extremely short (on the order of nanosecond) and low power pulses that have a very wide spectrum. In FIG. 1, a time hopping ultrawideband (TH-UWB) system is demonstrated. Each information carrying symbol is transmitted with a number of pulses, where in this case four pulses represent a symbol. Pulses occupy a location in the time-frame based on the specific pseudo random (PN) code assigned for each user. Two different codes and the corresponding pulse locations are shown with reference to FIG. 1. Note that these two codes are orthogonal, and as such they do not interfere with each other. The pulses of another user that interferes with the code of the first user are also shown to demonstrate how interference from other users affects the system. Each block in this figure represents a number of symbols, where forward error correction (FEC) coding, interleaving, and other MAC layer protocols might be applied. Impulse radio is advantageous in that it eliminates the need for up and down-conversion, and allows transceivers of low-complexity. It also enables the employment of various types of modulations, including on-off keying (OOK), pulse amplitude modulation (PAM), pulse position modulation (PPM), and binary phase shift keying (BPSK), as well as the use of different receiver types such as energy detectors, RAKE, and transmitted reference receivers.

Another strong candidate for UWB communication is the multi-carrier approach, which can be realized using Orthogonal Frequency Division Multiplexing (OFDM) as illustrated with reference to FIG. 2. OFDM has become a very popular technology due to its special features such as robustness against multipath interference, ability to allow frequency diversity with the use of efficient FEC coding, capability of capturing the multipath energy, and ability to provide high bandwidth efficiency. OFDM can overcome many problems that arise with high bit rate communications, the most significant of which is the time dispersion. In OFDM the data bearing symbol stream is split into several lower rate streams, and these streams are transmitted on different carriers. Since this increases the symbol period by the number of non-overlapping carriers, multipath echoes affect only a small portion of the neighboring symbols. Any remaining ISI can be removed by cyclically extending the OFDM symbol.

In terms of adapting the transmission parameters, OFDM offers many possibilities, including the ability to adapt the transmit power, the cyclic prefix size, the modulation and coding, and the number of sub-carriers. In addition to adaptation over each packet, in the case of single carrier system, OFDM also offers adaptation of the parameters for each carrier or over a small group of carriers. In other words, adaptation can be done independently over narrower bands rather than the entire transmission band. Similarly, reception of an OFDM signal offers new designs and approaches for adaptive receivers.

In a UWB system, the unlicensed usage of a very wide spectrum that overlaps with the spectra of narrowband technologies brings about some concerns. Therefore, a significant amount of research has been carried out to quantify the effect of UWB signals on narrowband systems. The transmitted power of UWB devices is controlled by the regulatory agencies (such as the FCC in the United States), so that narrowband systems are affected by UWB signals only at a negligible level. Therefore, UWB systems are allowed to co-exist with other technologies under stringent power constraints. This fact puts significant limitation on the variety of applications, maximum data rate, and transceiver design options, and the UWB system becomes very susceptible to the effects of the narrowband systems. Systems with a spectral allocation similar to UWB are known in the art as underlay systems, or shared unlicensed systems. The severe power limitations on underlay systems restrict their usage to only very short range devices. Therefore, all current UWB efforts are in the direction of making UWB systems work in an underlay scenario with a focus only on wireless personal area networks (WPAN).

In communications system design, dealing with interference is one of the main considerations. Interference can be defined as any kind of signal received aside from the desired signal and noise. According to its origin, interference can occur in two ways: (1) Self-interference, which is caused by the transmitted signal due to improper system design. Examples of self-interference include inter-symbol (ISI), inter-carrier (ICI), inter-frame (IFI), inter-pulse (IPI), and cross-modulation (CMI) interferences. Self-interference can be handled by properly designing the system and transceivers. (2) Interference from other users, which can be further categorized as: (a) Multi-user interference, which is the interference from users using the same system or a similar technology. Co-channel and adjacent channel interferences belong to this category. Multi-user interference can be overcome by proper multi-access design and/or employing multi-user detection techniques. (b) Interference from other types of technologies. This kind of interference mostly requires interference avoidance or cancellation. It is more difficult to handle compared to multi-user interference, and can often not be suppressed completely. Narrowband interference (NBI) is a well-known example of this type of interference.

UWB systems operate over extremely wide frequency bands, where various narrowband technologies also exist with much higher power levels as illustrated with reference to FIG. 3. The influence of these narrowband technologies on the UWB system can be significant, and in the extreme case, these signals may jam the UWB receiver completely. Even though narrowband signals interfere with only a small fraction of the UWB spectrum, due to their relatively high power with respect to the UWB signal, the performance and capacity of UWB systems can be affected considerably. The recent studies show that the bit-error-rate (BER) performance of the UWB receivers is greatly degraded due to the impact of narrowband interference. The high processing gain of the UWB signal can cope with the narrowband interferers to some extent. However, in many cases, even the large processing gain alone is not sufficient to suppress the effect of the high power interferers. Therefore, either the UWB system design needs to consider avoiding the transmission of the UWB signal over the frequencies of strong narrowband interferers, or the UWB receivers must employ NBI suppression techniques to improve the performance, the capacity, and the range of the UWB communications.

NBI is not a recent problem. For other wideband systems such as the code division multiple accessing (CDMA) system, this issue has been studied extensively. In these systems, NBI is partially handled with the processing gain, and by employing interference cancellation techniques including notch filtering, predictive techniques, minimum mean square error (MMSE) detectors, and transform domain techniques. However, the NBI problem in UWB is more challenging due for a variety of reasons. First, compared to the licensed CDMA systems, the unlicensed UWB extends a much wider frequency band, but transmits less power, thus forcing the UWB system to coexist with a higher number of powerful interferers. Second, in carrier modulated wideband systems, the received signal is down-converted to the baseband and sampled above the Nyquist rate, which allows it to be processed digitally. However, the UWB signal, being already in the baseband, can not be sampled at the Nyquist rate with the existing technology. Therefore, the numerous NBI suppression techniques proposed for other wideband systems, which can be realized by means of advanced signal processing methods, are not applicable to UWB systems.

In the literature, there are numerous influential studies focusing on NBI suppression for UWB systems. The methods proposed in these studies can be classified as avoidance and cancellation techniques. NBI avoidance methods are based on avoiding transmission over the frequencies of strong narrowband interferers. Multi-carrier approach, multi-band schemes, and pulse shaping are among the various avoidance methods. The cancellation methods, on the other hand, aim at eliminating the effect of NBI on the received UWB signal. MMSE combining, frequency domain techniques such as notch filtering, time-frequency methods like wavelet transform, and time domain approaches constitute the primary cancellation methods.

Accordingly, what is needed in the art is a flexible and adaptable radio access technology that can take advantage of the available spectrum in an opportunistic manner.

SUMMARY OF INVENTION

In accordance with an embodiment of the present invention, is provided a method of transmitting an ultrawideband (UWB) signal that is composed of an orthogonal frequency-division multiplexing (OFDM) based signal that is transmitted in an underlay manner and an impulse radio based signal that is transmitted in an overlay manner. The method includes the steps of determining an interference temperature for each of multiple carriers within the UWB signal, classifying each one of the multiple carriers of the signal as being an interfered carrier or a non-interfered carrier based on the interference temperature for each one of the multiple carriers, transmitting the signal on the interfered carriers at a signal power that is not greater than the power limit of the underlay UWB policy and transmitting the signal on the non-interfered carriers at a signal power that is greater than the power limit of the underlay UWB policy.

In a specific embodiment, the non-interfered carriers further comprise side-lobes, and the method of the present invention further includes the step of employing transmission techniques for the non-interfered carrier which are effective in limiting the side-lobes of the carriers, thereby reducing interference within multiple carriers.

In an additional embodiment, each one of the multiple carriers are additionally classified as being either an underlay carrier or an overlay carrier, wherein an underlay carrier employs a low-powered sinc function for transmission of the signal and an overlay carrier employs a prolate spheroidal wavelet function for transmission of the signal. The use of different sets of pulses in the underlay and the overlay carriers results in inter-carrier interference. In an additional embodiment, successive interference cancellation is employed to reduce the inter-carrier interference.

In a particular embodiment, the interference temperature is determined for each one of the multiple carriers by performing an adaptive windowing technique to estimate the noise power, taking into account the variation of the noise statistics across multiple OFDM carriers and the OFDM transmission symbols.

In accordance with an additional embodiment, a system for transmitting an ultrawideband (UWB) signal that is composed of an orthogonal frequency-division multiplexing (OFDM) based signal that is transmitted in an underlay manner and an impulse radio based signal that is transmitted in an overlay manner is provided in which an interference temperature identification algorithm is used for determining an interference temperature for each of multiple carriers within the UWB signal. A classification algorithm is then employed for classifying each one of multiple carriers of the channel as being an interfered carrier or a non-interfered carrier based on the interference temperature for each one of the multiple carriers and a transmitter is then employed for transmitting the signal on the interfered carriers at a signal power that is not greater than the power limit of the underlay UWB policy and for transmitting the signal on the non-interfered carriers at a signal power that is greater than the power limit of the underlay UWB policy.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
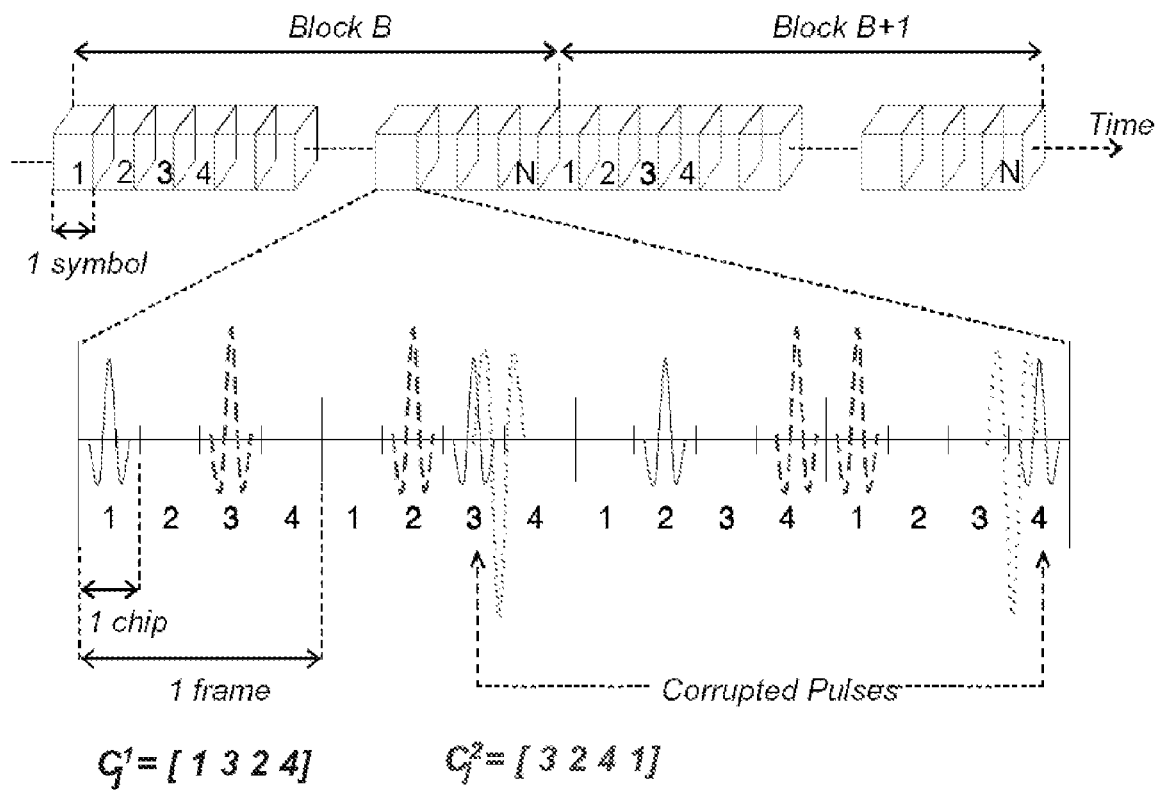
FIG. 1 is an illustrative example of an impulse radio based time hopping UWB scenario as is known in the art.
Figure 2:
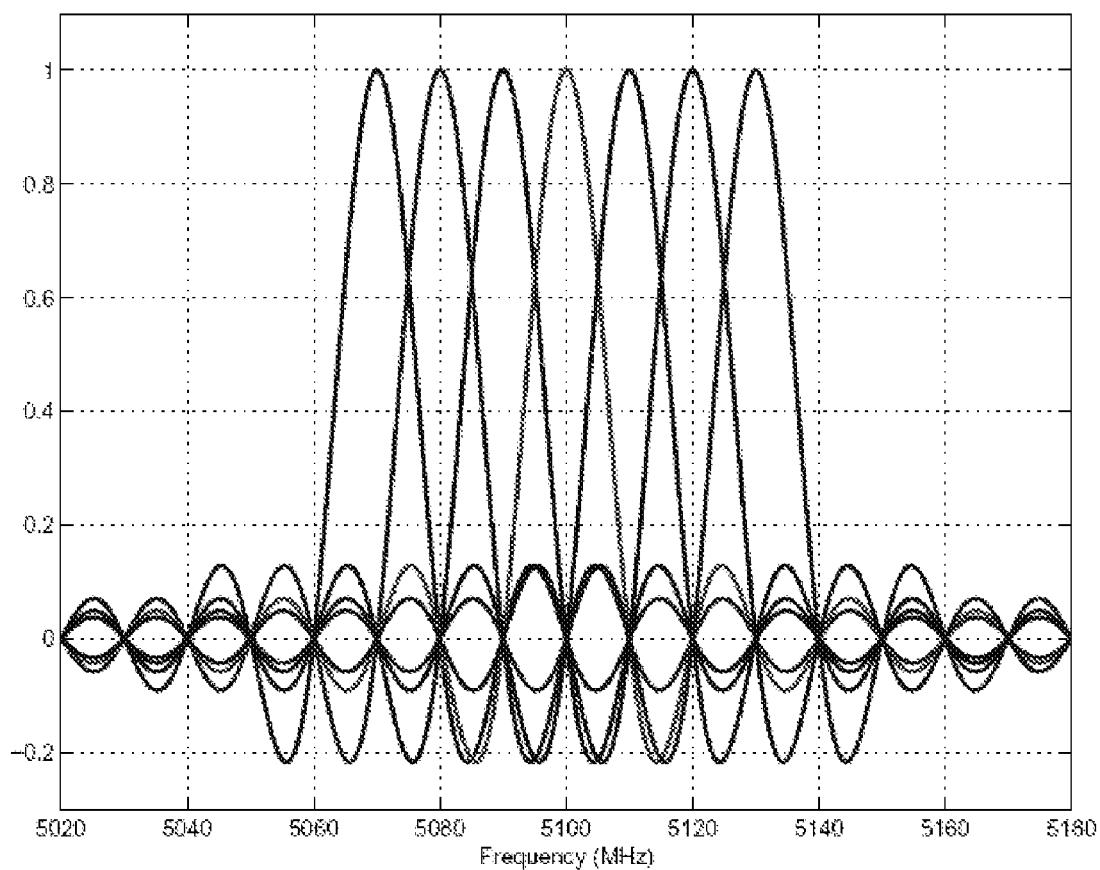
FIG. 2 is an illustrative example of the spectra of OFDM subcarriers, which correspond to sinusoidals multiplied with a rectangular window in time domain as is known in the art.
Figure 3:
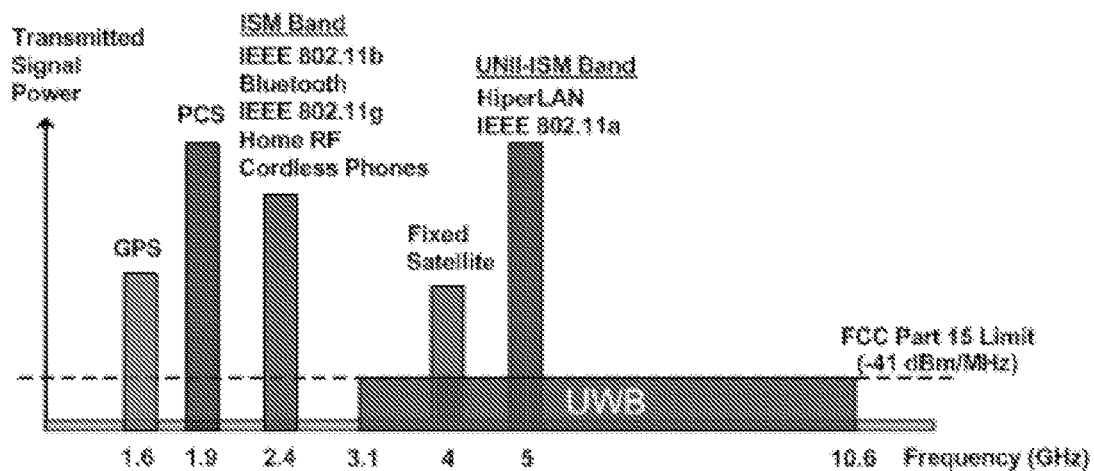
FIG. 3 is an illustrative example of spectrum crossover of the narrowband interferers in UWB systems as is known in the art.
Figure 4:
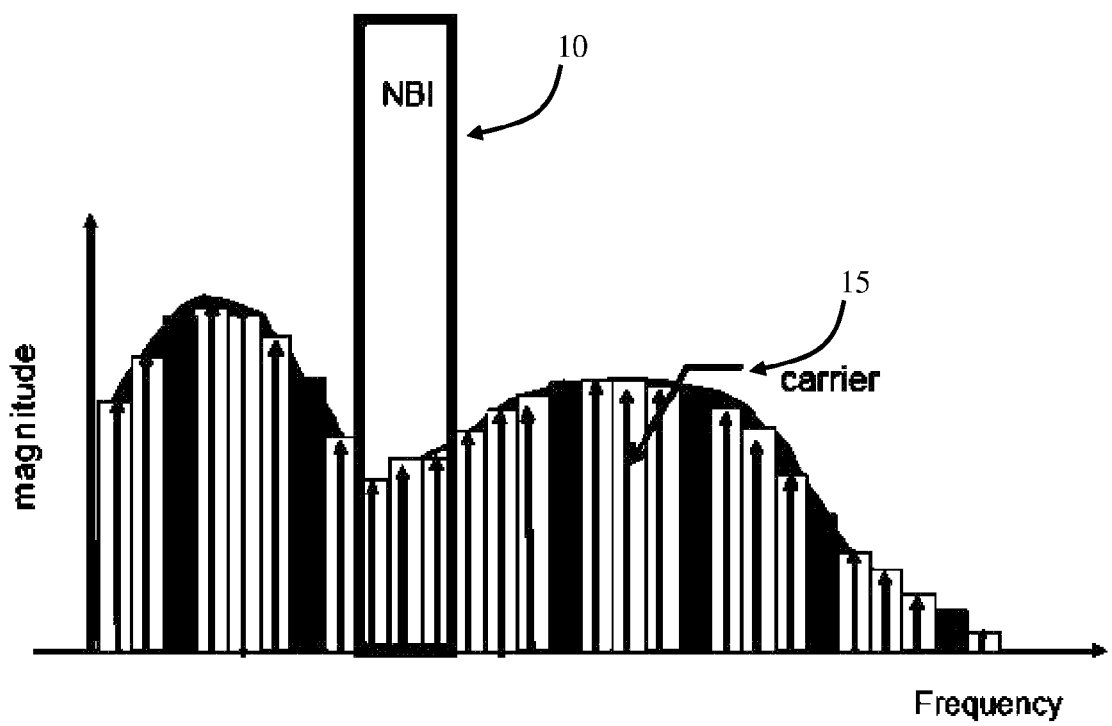
FIG. 4 is a diagrammatic view of a simple NBI scenario for multi-carrier modulation systems in accordance with the present invention.

In implementing a UWB system, resistance to narrowband interference (NBI) is one of the main concerns. The need for resistance to narrowband interference provides a strong motivation for employing OFDM in UWB applications. Along with its resistance against NBI, OFDM has the ability to turn the transmission on and off on separate carriers depending on the level of interference temperature. A common NBI model considered for OFDM is a zero-mean Gaussian random process that occupies certain carriers along with the white noise as:

$$S_n(k) = \begin{cases} \frac{N_i + N_w}{2}, & \text{if } k_1 < k < k_2 \\ \frac{N_w}{2}, & \text{otherwise} \end{cases}$$

where k is the carrier index, and $N_i/2$ and $N_w/2$ are the power spectral densities of the narrowband interferer and the white noise, respectively. In OFDM based UWB, NBI can be avoided by an adaptive OFDM system design. As the simple interference scenario illustrated in FIG. 4 shows, NBI 10 will corrupt only some carriers 15 in OFDM spectrum. Therefore, only the information that is transmitted over these frequencies will be affected by the interference. If the interfered carriers can be identified, transmission over these carriers can be avoided. In addition, by sufficient FEC and frequency interleaving, jamming resistance against NBI can be obtained. Avoiding or adapting the transmission over the strongly interfered carriers can provide more spectrum and power efficiency, as they increase the immunity against NBI, and hence relax the FEC coding power requirement.

In UWB-OFDM, to avoid NBI the transmitter requires feedback from the receiver. The receiver must then be able to identify the interfered carriers and send the relevant information back to the transmitter. Note that in such a scenario, the interference statistics need to be constant for a certain period of time. If the interference statistics change very quickly, by the time the transmitter receives the feedback information and adjusts the transmission parameters, the receiver may already be observing different interference characteristics. The feedback information can come from a variety of sources, including the interfered carrier index, interference power on these carriers, and the center frequency and the bandwidth of NBI. A complete practical implementation of these concepts requires smart transceivers with special capabilities such as performing spectrum measurement, communicating with the other devices in the system, and adjusting to the changing conditions. A strong potential candidate considered for satisfying these and similar requirements is the cognitive radio concept.

Traditional communication system designs focus on allocating fixed resources to the user. Adaptive design methodologies, on the other hand, typically identify the requirements of the user, and then allocate just enough resources, thus enabling more efficient utilization of system resources and consequently increasing capacity. Pushing the adaptive system design further by introducing multi-dimensionally awareness, sensing, and learning from its experiences to reason, plan, and decide future actions to meet user needs brings the cognitive radio concept into the wireless community. Ignited by the earlier work of Mitola, cognitive radio is a novel concept for future wireless communications, and it has been gaining significant interest among the academia, industry, and regulatory bodies.

Even though there is no consensus on the formal definition of cognitive radio, the concept has evolved recently to include various meanings in several contexts. One main aspect of it is related to autonomously exploiting locally unused spectrum to provide new paths to the spectrum access. Other aspects include: (1) inter-operability across several networks, (2) roaming across borders while being able to stay in compliance with local regulations, (3) adapting the system, transmission, and reception parameters without user intervention, (4) having the ability to understand and follow actions and choices taken by their users, (5) and over time learning to become more responsive and to anticipate the user needs.

One of the most important elements of the cognitive radio concept is the ability to measure, sense, learn, and be aware of parameters related to the radio channel characteristics, availability of spectrum and power, interference and noise temperature, the operational environments of the radio, user requirements and applications, available networks, nodes, and infrastructures, local policies and other operating restrictions. Since these parameters might change over time and over multitude of other dimensions, the radios need to be equipped with the proper mechanism to react to these changes.

Cognitive radio initiates a revolution regarding the spectrum allocation considerations. It pushes the limit on the most efficient exploitation of the entire spectrum, giving rise to a new concept called soft spectrum usage. This involves the soft usage of the current licensed and unlicensed available spectrum. Even though some of the spectrum is licensed for a specific application, the usage of the spectrum for this application might not be to the full extent. This fact is proved by a recent study conducted by the XG initiative of DARPA revealing that only 6% of the spectrum is fully utilized at all times. Currently, the major part of the spectrum is allocated (licensed) for specific technologies. Hence, regardless of whether the spectrum is fully used or not, it is only available for a group of wireless devices. Basically, the static assignment of the spectrum to different technologies (or operators) is what causes the inefficient spectrum usage. If a wireless device (or system) has the ability to operate over any carrier frequency with any bandwidth, as well as the capability to identify the most suitable band (with less interference) to operate, then, the cognitive radio concept will be a reality. One of the major challenges is to be able to identify the most suitable band (carrier frequency and bandwidth) within which to operate. This challenge requires scanning a wide spectrum, a mechanism that can be called spectral sensing, and measuring a lot of parameters relative to the channel and interference conditions. Once the channel behavior is accurately predicted, the transceivers can negotiate cognitive functions including channel coding, modulation rate, location, and mobility. Another important challenge is to provide the transceiver with the ability to operate over a wide range of spectrum with different bandwidths, a feature that gives the cognitive radio a spectrum shaping capability. The current transceivers known in the art include an analog front-end, which is mostly fixed for a specific function to operate over a small range of frequencies. Such an analog front-end is not flexible and not programmable. This gives rise to a new concept called software defined radio (SDR), where this fixed analog circuitry needs to be replaced with software programmable hardware. The ideal SDR concept digitizes the received signal as soon as possible so that a flexible radio functionality can be obtained. As can be seen, this is a challenge with the current analog-to-digital-converter (ADC) capabilities and with the processing power currently available. Therefore, currently, the new generation wireless systems are slowly integrating a version of this concept.

In the literature, there are a limited number of methods proposed regarding the implementation of spectral sensing for cognitive radio. At the system level, spectral sensing can be implemented in an individual or distributed manner. In the individual sensing manner, the cognitive UWB device senses the spectrum by its own means and depends on this knowledge when making decisions. On the other hand, in the distributed sensing manner, which can be either centralized or non-centralized, multiple devices scan the spectrum, and share the gathered information with each other. The difference between the centralized and non-centralized approaches is that in the former one there is a center, which partially acts like a base station. It receives the sensing information from all the devices, processes this information, and allocates the available spectrum to the devices in the network, accordingly.

In accordance with an embodiment of the present invention is provided a method for taking the UWB-OFDM from its current form and supplementing it with cognitive radio capabilities. The present invention is effective in avoiding the NBI and exploiting the unoccupied spectrum in an opportunistic way. In the case of UWB-OFDM communication systems it would be expected that for UWB devices without cognitive capabilities, the power limitations specified with the published spectral masks will be maintained. By contrast, for the cognitive UWB radio systems as described by the present invention it would be expected that the regulatory agencies will provide additional freedom for the transmitted power. By raising the power level, UWB devices will no longer be restricted to short range applications, which is the case today. A motivating example is the fact that the Spectrum Policy Task Force (SPTF) of the FCC has already been considering alternative ways of allocating the spectrum. Assuming that the regulation will provide room for cognitive spectrum usage in the future, the focus of the present invention is on how to develop a new concept based on UWB-OFDM to utilize the available spectrum opportunistically. As such, instead of considering the coexisting narrowband systems as interfering users, the present invention treats them as the primary users, who have the exclusive right for using the spectrum. In this scenario, the primary users will always have the right to occupy the allocated spectrum. The UWB users, on the other hand, will be treated as secondary users, and will share the spectrum in an opportunistic manner, if it is available.

The present invention provides a noise temperature estimation technique for UWB-OFDM systems, where the noise and interference are not interpreted as a single white noise term (which is the way they have been interpreted in the literature so far), instead, the color and other statistics of the interference have been taken into account for improved interference temperature estimation. Conventional algorithms assume that the noise statistics remain constant over the OFDM frequency band, and thereby average the instantaneous noise samples to get a single estimate. In reality, noise is often made up of white Gaussian noise along with correlated colored noise that affects the OFDM spectrum unevenly. Accordingly, the present invention employs an adaptive windowing technique to estimate the noise power that takes into account the variation of the noise statistics across the OFDM sub-carrier index as well as across OFDM symbols is employed.

Figure 5:
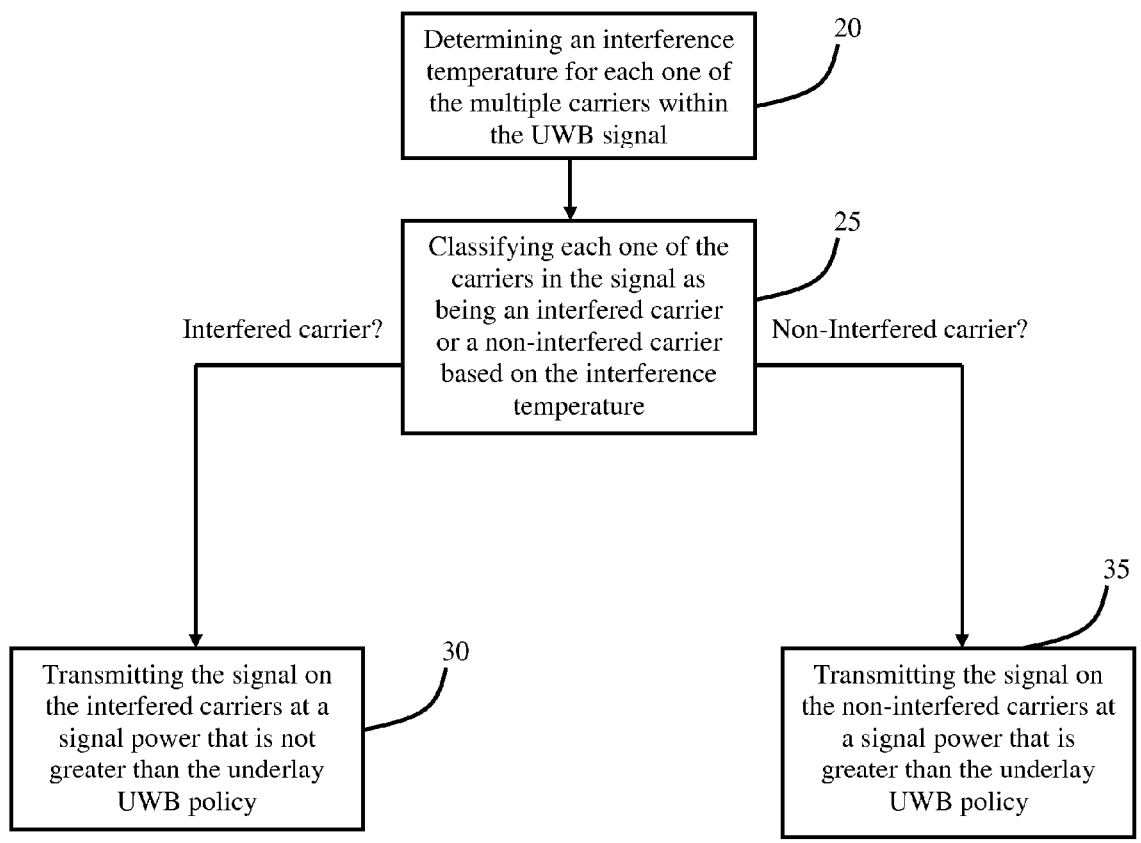
FIG. 5 is a flow diagram illustrating the method in accordance with the present invention.

With reference to FIG. 5, the present invention provides a system and method to utilize the unused portions of the spectrum in an intelligent way by employing a novel UWB-OFDM transmission scheme based on the assumption that the interference temperature is determined for all the available carriers 20. The main idea is to combine the underlay policy with the opportunistic spectrum usage approach. With this purpose, different sections of the spectrum are classified as interfered or non-interfered according to the interference temperature level 25. At the interfered sections, the UWB-OFDM transmitter acts like a conventional system. Hence, the transmitted power over these sections does not exceed the limits determined by the underlay UWB scheme 30. On the other hand, at the non-interfered sections, where the spectrum is open to opportunistic usage, the transmitter takes advantage of the case, and transmits more power 35.

Figure 6:
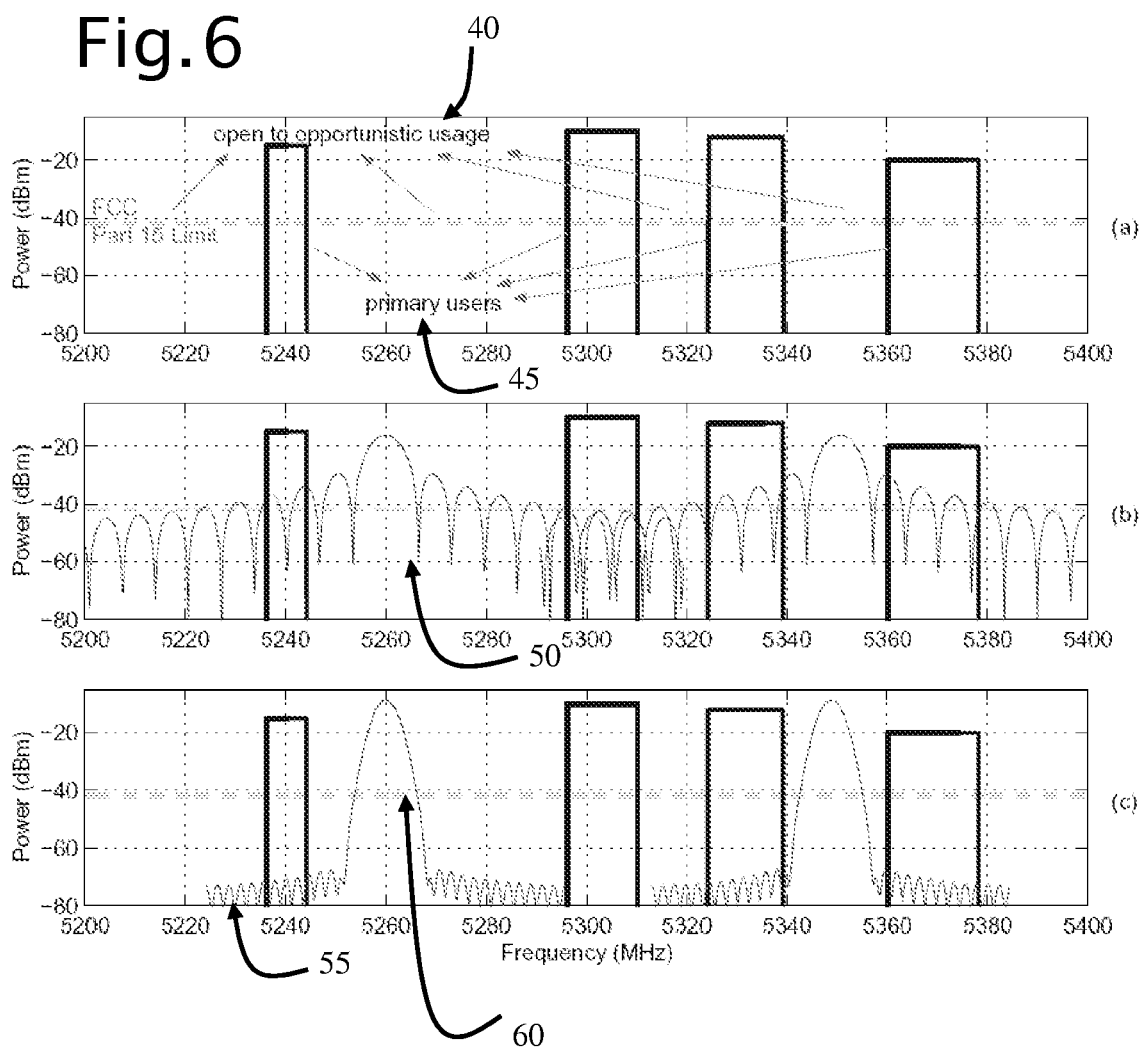
FIG. 6 is a diagrammatic view of (a) A snap-shot of the spectrum in time, (b) Opportunistic spectrum utilization employing conventional subcarriers and (c) Opportunistic spectrum usage employing special subcarriers, in accordance with the present invention

In employment of the present invention, the side-lobes of the carriers at which more power is transmitted must be designed so that they do not create excessive interference on the primary users. In order to solve the problem involving the side-lobes of the carriers creating excessive interference on the primary users, at the transmitter the carriers are split into underlay and overlay carriers. Different pulses and types of filtering are applied for these two sets of carriers. Each set has orthogonality among its own carriers. But, the carriers in one set do not have to be orthogonal to the carriers in the other set. With reference to FIG. 6, FIG. 6(a) illustrates a snap-shot of the spectrum of interest in time showing the portions of the spectrum that are open to opportunistic usage 40 based on the interference temperature and the portions of the spectrum which are being used by the primary carriers 45. FIG. 6(b) illustrates the opportunistic spectrum utilization employing convention subcarriers 50 that result is side-lobes that create excessive interference on the primary users. FIG. 6(c) illustrates the opportunistic spectrum employing special subcarriers. The special subcarriers are designed to take advantage of the spectrum that allows a higher power level 60 without interfering with the area of the spectrum that is being used by the primary users 55. The underlay carriers are obtained by means of taking the IFFT of the data to be transmitted. Since this corresponds to multiplying the data with time-limited sinusoidals, the carriers in frequency domain are low powered sinc functions.

Figure 7:
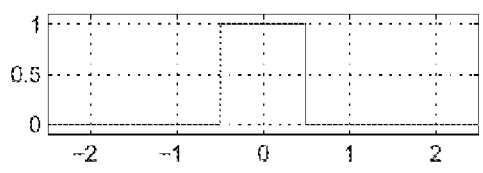
FIG. 7 is a diagrammatic view of (a) Different time domain signals and their spectra a. Rectangular window, (b) Raised cosine windows with roll-off factors α=0.3 and α=0.9, (c) Root raised cosine windows with the same roll-off factors and (d) A specific prolate spheroidal wavelet function, in accordance with the present invention.
Figure 7:
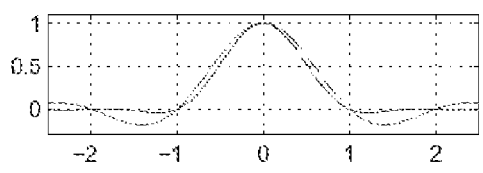
Figure 7:
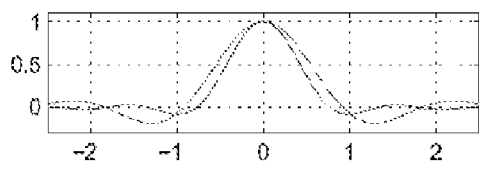
Figure 7:
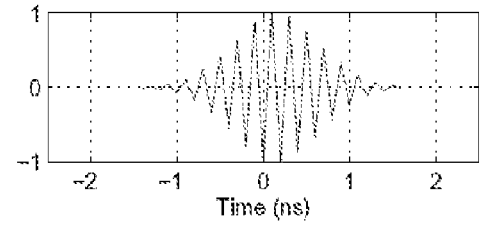

For the transmission of the overlay carriers, having sinc functions (in the frequency domain) would be problematic. The reason is that the high side-lobes of the sinc, which are going to be more effective due to the boosted power of the overlay signal, can disturb the primary users in the adjacent bands. Multiplying the overlay signal with a raised cosine temporal window seems to be a possible solution at a first glance. However, at a high level of transmitted power, the resulting sidelobes may still not be low enough as illustrated with reference to FIG. 7. Another drawback is that this operation broadens the signal in time. Hence, for the overlay transmission, it is very important to come up with special pulses that have sharp fall-offs and suppressed side lobes in the frequency domain, are limited both in time and bandwidth, have a pulse width and bandwidth that can be controlled simultaneously and are able to be shifted to anywhere in the spectrum without a need for up-conversion or down-conversion. In accordance with a particular embodiment of the present invention, a prolate spheroidal wavelet function (PSWF) is employed to provide special pulses for the overlay transmission which satisfy these requirements to a large extent. FIG. 7(a) illustrates the different time domain signals with their spectra and the rectangular window employed. FIG. 7(b) illustrates the raised cosine windows with roll-off factors of $\alpha=0.3$ and $\alpha=0.9$. FIG. 7(c) illustrates the root raised cosine windows with the same roll-off factors as used with reference to FIG. 7(b) and FIG. 7(d) illustrates a specific prolate spheroidal wavelet function.

Note that using different sets of pulses in different carriers will create inter-carrier interference (ICI) at the receiver as these pulses are not necessarily orthogonal to each other. In accordance with an additional embodiment of the present invention, the problem of inter-carrier interference is handled using successive interference cancellation approaches. In the receiver, the carriers with higher power levels will be detected first (with negligible interference from the weaker carriers). The effect of these carriers will then be removed from the received signal, and the weaker carriers will be detected the conventional manner.

Cognitive radio and opportunistic spectrum usage will certainly increase the spectral efficiency. However, there are several challenges to achieve the true implementation of cognitive radio. The first challenge is to develop a flexible and adaptable radio access technology that can take advantage of the available spectrum in an opportunistic way. OFDM is shown to be an attractive technology because of various adaptation capabilities. On the other hand, UWB can allow the usage of the spectrum in an underlay manner to increase the spectral efficiency. The present invention illustrates that the marriage of the opportunistic spectrum usage with OFDM based UWB will open the doors for further improvements in spectral efficiency, and bring about concepts that will allow the joint underlay and overlay usage of the spectrum.

Sensing the primary users and searching for opportunity across the multiple dimensions of the spectrum world is a great research area for academic and industrial communities. UWB, which is transmitting over a wide bandwidth, along with the UWB receivers, which are already designed with the capability of capturing anything within the transmission bandwidth, can also be equipped to process, measure, and sense the primary users over the transmission bandwidth without the need of additional units. Not only the noise temperature, but also additional statistical and deterministic information about the primary users can be extracted with the OFDM based UWB technology.

Shaping the power spectrum of the transmitted signal while taking advantage of the spectral opportunities as efficiently as possible without creating any disturbance to the primary users is another great research area. Again, the present invention shows that OFDM based UWB provides an appropriate signaling format to accomplish this goal.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of transmitting an ultrawideband (UWB) signal that is composed of an orthogonal frequency-division multiplexing (OFDM) based signal that is transmitted in an underlay manner and an prolate spheroidal wavelet function based impulse radio based signal that is transmitted in an overlay manner, wherein the UWB signal further comprises an underlay wireless system transmission power limit set by a regulatory agency the method comprising the steps of:
  determining a power level for each of a plurality of carriers within the UWB signal;
  classifying each one of the plurality of carriers of the channel as being an interfered carrier or a non-interfered carrier based on the power level for each one of the plurality of carriers;
  transmitting an OFDM signal on the interfered carriers at a signal power that is not greater than the underlay wireless system transmission power limit set by the regulatory agency; and
  transmitting a prolate spheroidal wavelet function based impulse radio signal on the non-interfered carriers at a signal power that is greater than the underlay wireless system transmission power limit set by the regulatory agency.

2. The method of claim 1, wherein the non-interfered carriers further comprise side-lobes, the method further comprising the step of employing transmission techniques for the non-interfered carrier which are effective in limiting the side-lobes of the carriers, thereby reducing interference within the plurality of carriers.

3. The method of claim 1, wherein inter-carrier interference is created by the interaction between the overlay and the underlay carriers, the method further comprising the step of employing successive interference cancellation to reduce the inter-carrier interference.

4. The method of claim 1, wherein the step of determining power level for each of a plurality of carriers further comprises performing an adaptive windowing technique to estimate the noise power taking into account the variation of the noise statistics across the plurality of OFDM carriers and the OFDM transmission symbols.

5. A system for transmitting an ultrawideband (UWB) signal that is composed of an orthogonal frequency-division multiplexing (OFDM) based signal that is transmitted in an underlay manner and an prolate spheroidal wavelet function based impulse radio based signal that is transmitted in an overlay manner, wherein the UWB channel comprises an underlay wireless system transmission power limit set by a regulatory agency, the system comprising:
  a power level identification algorithm for determining a power level for each of a plurality of carriers within the UWB channel;
  a classification algorithm for classifying each one of the plurality of carriers of the channel as being an interfered carrier or a non-interfered carrier based on the power level for each one of the plurality of carriers; and
  a transmitter for transmitting an OFDM signal on the interfered carriers at a signal power that is not greater than the underlay wireless system transmission power limit set by the regulatory agency and for transmitting a prolate spheroidal wavelet function based signal on the non-interfered carriers at a signal power that is greater than the underlay wireless system transmission power limit set by the regulatory agency.

6. The system of claim 5, wherein the non-interfered carriers further comprise side-lobes and the transmitter further comprises means for employing transmission techniques for the non-interfered carrier which are effective in limiting the side-lobes of the carriers, thereby reducing interference within the plurality of carriers.

7. The system of claim 5, wherein inter-carrier interference is created by the interaction between the overlay and the underlay carriers, the transmitter further comprising means for employing successive interference cancellation to reduce the inter-carrier interference.

8. The system of claim 5, wherein the power level identification algorithm further determines the power level for each of the plurality of carriers by performing an adaptive windowing technique to estimate the noise power taking into account the variation of the noise statistics across multiple OFDM carriers and the OFDM transmission symbols.

* * * * *